May 12, 1964   R. A. PRITCHETT   3,132,506
LEAK DETECTOR FOR FLUID CONDUCTORS
Filed Jan. 29, 1962
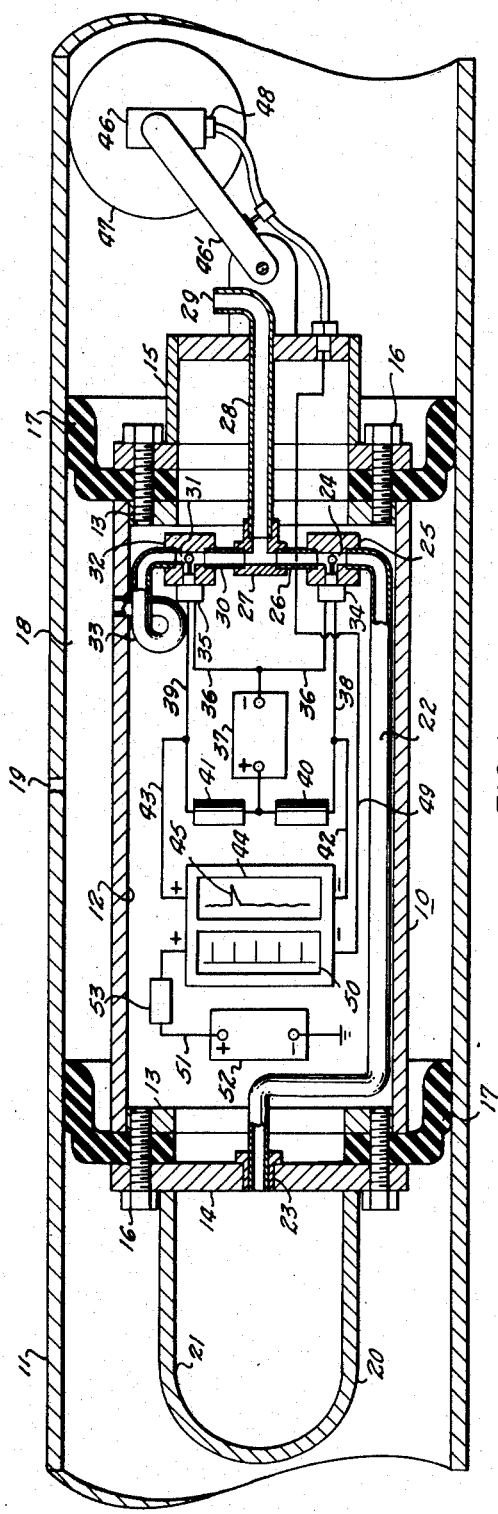
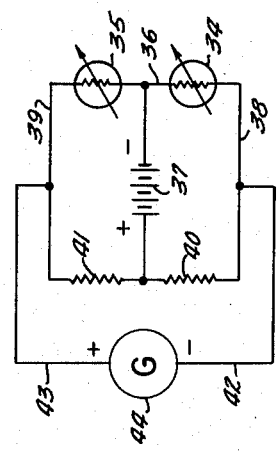
FIG.3
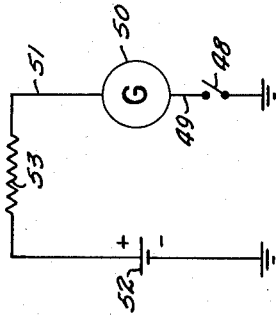
FIG.2
FIG.1
INVENTOR.
Ray A. Pritchett
BY *Ihley & Ihley*
ATTORNEYS

United States Patent Office 3,132,506
Patented May 12, 1964

3,132,506
LEAK DETECTOR FOR FLUID CONDUCTORS
Ray A. Pritchett, Dallas, Tex., assignor to Pipeline Surveys, Ltd., Dallas, Tex., a Texas limited partnership
Filed Jan. 29, 1962, Ser. No. 169,510
8 Claims. (Cl. 73—40.5)

This invention relates to new and useful improvements in leak detectors for fluid conductors and more particularly pipelines.

One object of the invention is to provide an improved leak detector for pipelines and other fluid conductors of high sensitivity so as to be capable of accurately locating and recording minute leaks.

Another object of the invention is to provide an improved leak detector of such construction that it will compensate for variations of the pressure in the fluid conductor and pressure surges caused by pump impulses and differences in the frictional engagement between the detector and conductor due to joints and slight variations of the internal diameter of the conductor.

An important object of the invention is to provide an improved leak detector having flow sensitive means mounted in a passage of small area which establishes communication between the interior of the fluid conductor and a chamber open to the inner surface of said conductor whereby the sensitive means is responsive to slight variations of the flow of fluid through the passage in either direction.

A particular object of the invention is to provide an improved leak detector, of the character described, having a surge chamber communicating with the interior of the fluid conductor through a similar passage in which similar flow sensitive means is mounted so as to be responsive to and compensate for pressure surges and other variations of the pressure in said conductor.

A further object of the invention is to provide an improved leak detector, of the character described, wherein the flow sensitive means includes a thermistor disposed in a passage of extremely small diameter so as to respond to small volumes of flow and detect minute leaks.

A construction designed to carry out the invention will be hereinafter described, together with other features of the invention.

The invention will be more readily understood from a reading of the following specification and by reference to the accompanying drawing, wherein an example of the invention is shown, and wherein:

FIG. 1 is a longitudinal, sectional view, partially diagrammatical, of a leak detector constructed in accordance with the invention and positioned in a fluid conductor, FIG. 2 is a wiring diagram of the odometer circuit, and FIG. 3 is a wiring diagram of the recording circuit of the leak detector.

In the drawings, the numeral 10 designates the cylindrical body or housing of a leak detector which is adapted to be pumped or otherwise moved longitudinally through a pipeline or other conductor 11 of liquid, gas or other fluid and which has a cylindrical bore 12. Internal, radial flanges or rings 13 are provided at the ends of the bore 12 for attaching a circular front end plate 14 and an externally flanged rear end cap 15 to the housing 10 by means of bolts 16. Cup-shaped packing rings 17, of elastic or other suitable material, have their inner portions confined on the bolts 16 by the plate 14 and cap 15 for sealing off between the housing and the bore or inner surface of the pipeline 11 and providing an annular chamber or space 18 therebetween that is adapted to communicate with and isolate any leaks 19 in said pipeline. The front end plate 14 has a dome-shaped member 20 projecting axially from its outer surface to provide a surge chamber 21 which communicates with a tube 22 extending through said plate into the housing bore 12. As shown by the numeral 23, the tube 22 may be secured in an axial opening in the plate by a suitable fitting.

From the plate 14, the tube extends longitudinally through the housing bore into the transverse passage 24 of a cell 25 at the rear end of said bore. A nipple 26 connects the passage 24 to a T 27 suitably mounted in the medial portion of the bore 12 and communicating with a tube 28 extending axially through the rear end cap 15. The outer end 29 of the tube 28 communicates with the bore of the pipeline 11 and may be bent laterally. Another nipple 30 connects the T 27 to the transverse passage 31 of a cell 32, which is substantially identical to the cell 25, and a tube 33 leads from said passage to the annular chamber or space 18 formed by the packing rings 17 between the housing and pipeline. Due to this arrangement, both the chambers 18 and 21 communicate with the bore of the pipeline and are exposed to the pressure of the fluid therein. It is noted that the passages 24 and 31 of the cells 25 and 32 are of extremely small diameter, said diameter being shown greatly enlarged for purposes of illustration, so as to contain only small volumes of fluids and are of the same diameter so as to accommodate the same amount of flow. Also, the annular and surge chambers, including their respective tubes 33 and 22, are of the same volume.

For sensing the flow of fluid to and from the chambers 18 and 21, identical electro-thermal sensors or thermistors 34 and 35 are mounted in the passages 24 and 31 of the cells 25 and 32 and are connected by leads 36 to the negative terminal of a battery suitably mounted in the housing bore 12. As shown diagrammatically in FIG. 3, the thermistors 34 and 35 are connected to the positive terminal of the battery 37 by additional leads 38 and 39 which have impedances or resistors 40 and 41, of equal value, mounted therein. From the leads 38 and 39, between the thermistors and resistors, leads 42 and 43 extend to the opposite sides of a recording galvanometer 44 to complete a Wheatstone bridge. Since the resistances of the thermistors are equal, the Wheatstone bridge is balanced so that the galvanometer 44 normally reads zero. When the annular chamber 18 communicates with a portion of the pipeline 11 having no leaks therein, the pressures in said chamber and pipeline are equal and there is no flow therebetween. Due to the pressure in the surge chamber 21 being the same, there is no flow past the thermistors 34 and 35 and the galvanometer remains at zero. It is noted that the thermistor 34 compensates for variations in the temperature of the fluid in the pipeline in the usual manner.

Upon encountering a leak 19 in the pipeline, the pressure in the annular chamber 18 is reduced since the external pressure is less than the internal pressure of said pipeline. Fluid flows to the chamber 18 through the tube 28, T 27, nipple 30, cell passage 31 and tube 33 until the pressure is equalized. The thermistor 35 is exposed to and cooled by this flow of fluid and, due to its negative temperature coefficient of resistance, its resistance increases and causes a voltage rise across said thermistor. As a result, the lead 43 becomes positive with respect to the lead 42 and causes current to flow through the recording galvanometer 44 which records the leak as shown at 45 in FIG. 1. The magnitude of the recorded response is proportional to the size of the leak. Since the cell passage 31 is of extremely small diameter, comparable to a capillary tube, a minute leak in the pipeline causes a flow through said passage which is sufficient to activate the thermistor and actuate the galvanometer. Accordingly, the detector is highly sensitive and will detect the smallest of leaks.

The surge chamber 21 is provided to compensate for or discriminate against pump impulses and pressure surges in the pipeline 11. Usually, pressure surges occur when the detector encounters a portion of the pipeline which is out of round or of reduced internal diameter. This increases the frictional engagement of the packing rings 17 with the bore of the pipeline and slows or stops the travel of the detector whereby the pressure in said pipeline behind said detector increases. The resulting pressure differential causes fluid to flow from the pipeline to the chambers 21 and 18 through the tube 28, T 27, nipples 26 and 30, cell passages 24 and 31 and tubes 22 and 33 until the pressures are equalized. Due to this fluid flow, the thermistors 34 and 35 are cooled and their resistances are increased so as to cause voltage rises thereacross. Since the thermistors are identical and are exposed to the same volume of flow, however, the Wheatstone bridge remains in balance and the galvonometer 44 does not respond to nor record the fluid flow. Similar pressure differentials may be created by pump impulses or joints in the pipeline and are compensated for in the same manner.

In order to record the location of leaks 19 in the pipeline 11, an odometer 46 is provided and includes a wheel 47 for rotatable engagement with the inner surface of said pipeline. A suitable bracket assembly 46' is mounted on the rear end cap 15 of the housing 10 for rotatably supporting the wheel 47. The odometer 46 is of conventional construction and has a switch 48 which is adapted to be closed momentarily at intervals corresponding to a predetermined distance of travel, such as one hundred feet, said odometer being driven by rotation of its wheel 47. A lead 49 connects the switch 48 to a recording galvonometer 50 suitably mounted in the housing bore 12 and connected by a lead 51 to the positive terminal of a battery 52. The lead 51 has an impedance or resistor 53 mounted therein, and the switch and the negative terminal of the battery are grounded (FIG. 2). When the switch 48 is closed, current flows from the negative terminal of the battery 52, through said switch, galvonometer 50 and resistor 53 to the positive terminal of said battery so as to actuate said galvonometer.

Although primarily adapted for use in pipelines, it is readily apparent that the detector is capable of being employed in other fluid conductors including well pipes. Also, it is noted that the detector need not be pumped through the conductor since it could be pulled therethrough or lowered in a well pipe by means of a weight. Again, attention is directed to the fact that the detector is highly sensitive to leaks because the thermistor 35 is mounted in a capillary tube or passage of extremely small diameter so as to be responsive to small volumes of flow. Due to the provision of the surge chamber and thermistor 34, the detector compensates for pressure surges and other variations of pressure in the conductor being tested. Also, the latter thermistor serves as a temperature compensator.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A leak detector for fluid conductors including a housing adapted to be moved longitudinally through a fluid conductor, means on the housing for sealing off between said housing and the inner surface of the conductor and providing a chamber therebetween whereby the chamber has a portion thereof formed by the conductor inner surface and communicates with leaks in the conductor, a first passage in said housing establishing communication between said chamber and conductor whereby the pressures therein are substantially equal, a second passage in said housing communicating with the conductor, each passage having at least a portion of small area capable of containing only a small volume of fluid, a thermistor in each passage portion of small area responsive to small volumes of flow, recording means in the housing, an electrical bridge circuit including a potential source and a pair of arms connecting the thermistors to the recording means.

2. A leak detector as set forth in claim 1 including a fixed resistance of the same value mounted in each arm of the electrical bridge circuit, the thermistors having the same negative temperature coefficient of resistance.

3. A leak detector for fluid conductors including a housing adapted to be moved longitudinally through a fluid conductor, means on the housing for sealing off between said housing and the inner surface of the conductor and providing a chamber therebetween whereby the chamber has a portion thereof formed by the conductor inner surface and communicates with leaks in the conductor, a first passage in said housing establishing communication between said chamber and conductor whereby the pressures therein are substantially equal, a surge chamber in said housing of substantially the same volume as the first-mentioned chamber, a second passage establishing communication between the surge chamber and conductor whereby the pressures therein are substantially equal, each passage having at least a portion of small area capable of containing only a small volume of fluid, a thermistor in each passage portion of small area responsive to small volumes of flow, recording means in the housing, and an electrical bridge circuit including a potential source and a pair of arms which connect the thermistors to the recording means, the thermistor in the second passage compensating for pressure surges in the conductor as well as temperature variations by preventing unbalancing of the bridge circuit except when said first-mentioned chamber communicates with a leak in the conductor.

4. A leak detector for fluid conductors including a housing adapted to be moved longitudinally through a fluid conductor, means on the housing for sealing off between said housing and the inner surface of the conductor and providing a chamber therebetween whereby the chamber has a portion thereof formed by the conductor inner surface and communicates with leaks in the conductor, a passage in said housing establishing communication between said chamber and conductor whereby the pressures therein are substantially equal, a second passage in said housing communicating with the conductor, each passage having at least a portion of small area capable of containing only a small volume of fluid, flow sensitive means in each passage portion of small area responsive to small volumes of flow, recording means, and an electrical bridge circuit including a potential source and a pair of arms which connect the flow sensitive means to the recording means.

5. A leak detector as set forth in claim 4 including a second chamber in the housing communicating with the second passage so that the pressure therein is substantially equal to the pressure in the conductor, the second chamber being of substantially the same volume as the first-mentioned chamber whereby the flow sensitive means of said second passage compensates for pressure surges in the conductor by preventing unbalancing of the electrical bridge circuit except when said first-mentioned chamber communicates with a leak in the conductor.

6. A leak detector as set forth in claim 4 including a fixed resistance of the same value mounted in each arm of the electrical bridge circuit, the flow sensitive means having the same negative temperature coefficient of resistance and being responsive to the ambient temperature of the fluid in the conductor so as to compensate for temperature variations.

7. A leak detector as set forth in claim 4 wherein the small area portions of the passages are of the same area, the flow sensitive means having the same negative temperature coefficient of resistance.

8. A leak detector as set forth in claim 4 wherein the flow responsive means of the second passage is responsive to the ambient temperature and compensates for temperature variations.

References Cited in the file of this patent

UNITED STATES PATENTS

| | | |
|---|---|---|
| 1,912,485 | Kothny | June 6, 1933 |
| 2,552,890 | Eisler | May 15, 1951 |
| 2,580,182 | Morgan et al. | Dec. 12, 1951 |
| 2,731,826 | Wiley | Jan. 24, 1956 |
| 2,799,165 | Varvel | July 16, 1957 |
| 2,940,302 | Scherbatskoy | June 14, 1960 |
| 2,951,362 | EnDean et al. | Sept. 6, 1960 |

FOREIGN PATENTS

| | | |
|---|---|---|
| 136,964 | Russia | Mar. 31, 1960 |